July 9, 1935.  G. A. KULL  2,007,684
ANIMATED SIGN
Filed Jan. 21, 1935

INVENTOR.
GUSTAVE A. KULL.
BY
ATTORNEY.

Patented July 9, 1935

2,007,684

UNITED STATES PATENT OFFICE 2,007,684

ANIMATED SIGN

Gustave A. Kull, Elkhart, Ind.

Application January 21, 1935, Serial No. 2,715

10 Claims. (Cl. 40—37)

The invention relates to an animated sign, and particularly to a wind operated outdoor sign.

The principal object of the invention is to provide a device of this character comprising a housing from which portions of a wind actuated rotor project and which has display indicia with which a shiftable member actuated by said rotor cooperates for visual association.

A further object is to provide a device of this character comprising an open sided housing in which a rotor is journaled adjacent said open side, and shiftable means associated with said housing and operatively connected with said rotor.

A further object is to provide wind operated motive means including a housing open at its upper end and journaling at a point below said open end a rotor which projects upwardly through said open end to be exposed to air currents at only one side of the axis thereof.

A further object is to provide wind operative motive means including a stationary open sided housing from which portions of a rotor journaled therein project, and means carried by said rotor for insuring actuation thereof by air currents moving at a slight angle to the axis of the rotor.

Other objects will be apparent from the appended claims, the description and the drawing.

In the drawing:—

Figure 1:
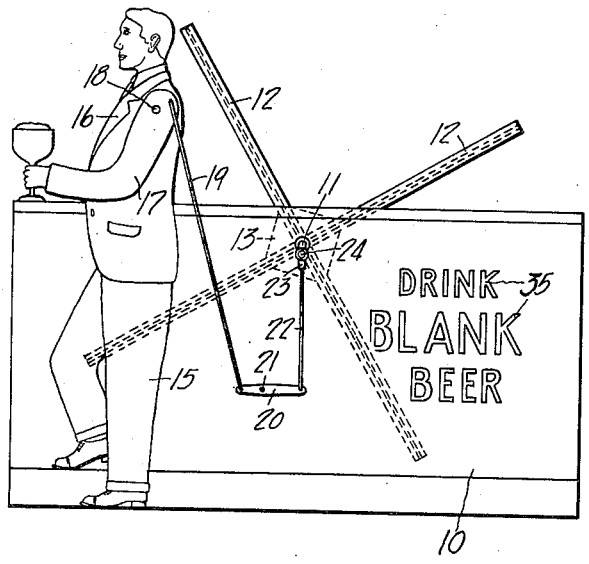
Figure 1 is a view of the device in front elevation.
Figure 2:
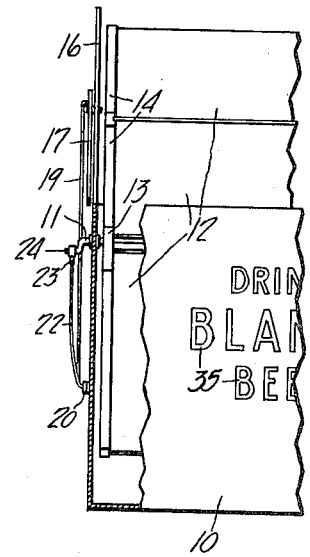
Figure 2 is a fragmentary end view of the device with parts broken away.
Figure 5:
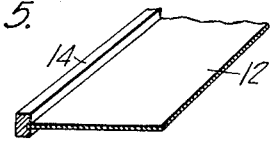
Figure 5 is a fragmentary perspective view of one of the rotor vanes.

Referring to the drawing, and particularly to Figures 1, 2 and 5 thereof, the numeral 10 designates a stationary housing, preferably of rectangular shape and including vertical walls of equal height throughout. Journaled in the upper end of said housing by means of a shaft 11 is a wind operated rotor comprising a plurality of blades or vanes 12 projecting radially from shaft 11 in equiangular balanced relation and supported and spaced by spacers 13. Each of the vanes is preferably reinforced, as best illustrated in Figure 5, by frame bars 14 secured to the opposite side edges thereof and projecting a substantial distance beyond the opposite faces of the vanes. The uppermost of these vanes partially project above the upper edge of the housing 10 at all times. The rotor is preferably formed of light weight construction and material to enable actuation thereof by slight breezes or air currents.

Imposed upon or otherwise associated with the front wall of the housing adjacent shaft 11 is a figure 15 which is to be animated, there being shown in the drawing the figure of a man provided in part by a configured upwardly projecting portion 16 of the front wall of the housing. Associated with this figure is a shiftable or animated part, there being here illustrated an arm shaped member 17 pivoted to portion 16 at the point 18.

The shiftable part 17 is connected with the rotor shaft 11 for actuation thereby by means of a suitable stiff rod 19 pivoted to part 17 in spaced relation to pivot 18 at one end and pivoted at its other end to one end of a lever 20. The lever 20 is pivoted at 21 intermediate its ends to the front wall of the housing 10, and has pivoted to the end thereof opposite rod 19 another stiff rod 22 which extends upwardly and terminates in a suitable fitting 23. The end of shaft 11 is off-set at 24 exteriorly of housing 10 to form a crank, and fitting 23 of rod 22 is journaled on said crank.

In the operation of the device the wind or even a slight breeze striking the vanes 12 will actuate the rotor under all conditions except that wherein the air movement is in a direction parallel to the axis of shaft 11. The walls of the housing prevent the air currents from striking the lower portion of the rotor and hence the air currents can only strike the rotor at one side of the center thereof whereby rotation of the rotor is substantially unopposed. The frame bars 14 which project beyond the faces of vane 12 at the side edges of said vanes provide corners into which air currents directed at an angle to the vanes are trapped to permit utilization of at least a component of their force for actuating the rotor, so that, despite the stationary positioning of housing 10, air currents whose direction closely approaches parallelism with the shaft 11 will actuate the rotor. This rotation is then transmitted to the shiftable member 17 by means of rods 19 and 22 and lever 20, whereby said member 17 shifts relative to the housing portion 16 with which it is associated to animate the figure 15. The shiftable member 17 may be associated with the figure 15 at any part of the same, but is most effective when spaced above the housing to attract attention. In addition to its function of housing the lower portion of the rotor, the vertical walls of the housing also serve as signboards visible from any direction, and suitable advertising matter 35 of which the figure 15 may be illustrative, or which said figure may supplement, may be imposed on the walls thereof.

Figure 3:
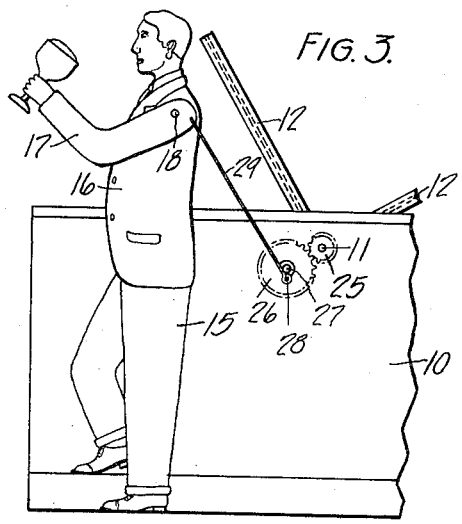
Figure 3 is a front view of a modified form of the device.

In Figure 3 is illustrated a modified construction of the device, wherein the shaft 11 of the rotor 12 mounts a pinion 25 at its outer end. Meshing with the pinion 25 is a pinion 26 of larger size which is suitably journaled for rotation on a stub shaft 27 carried by the housing. A pin 28 projects from pinion 26 in spaced relation to the center thereof and pivotally mounts one end of a stiff rod 29 whose opposite end is pivotally connected to shiftable member 17 in spaced relation to the pivot 18 thereof. By this construction the member 17 is shifted at a reduced speed and the rotation of pinion 26 is transmitted directly to said member.

Figure 4:
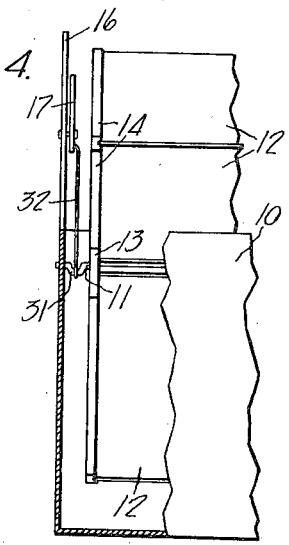
Figure 4 is a fragmentary end view of another modified form of the device with parts broken away.

In Figure 4 is illustrated another modification of the device, wherein the rotor 12 is spaced rearwardly from the front wall of housing 10, and the portion of shaft 11 passing through this space is provided with an off-set or crank portion 31 rearwardly of the front housing wall. The shiftable member 17 is pivoted to the rear side of projecting figure portion 16 to extend therebeyond. A stiff wire or rod 32 is mounted loosely on crank 31 at one end and is pivoted to shiftable member 17 at its other end to directly actuate said member. By this construction the exposure of the working parts of the device to the eye is reduced to a minimum, and the same may be entirely hidden if the projecting figure portion 16 is of a large size and positioned at or adjacent the center of the front wall of the housing so that rod 32 is concealed therebehind.

The invention having been set forth, what is claimed as new and useful is:—

1. In an animated sign, an open sided housing, a shaft journaled for rotation in said housing, a wind driven rotor mounted on said shaft to project from said housing at one side of the axis of rotation thereof, said housing having advertising material imposed thereon including a figure outlined at least in part by a portion projecting beyond said housing, a member representing a part of said figure pivoted to said projecting portion, a crank carried by said shaft, and means for transmitting movement of said crank to said pivoted member to actuate the same relative to said projecting portion, said means including a connecting rod pivoted to said member eccentrically of the pivot thereof.

2. In an animated sign, a stationary open sided housing, a shaft journaled for rotation in said housing, a wind driven vane rotor mounted on said shaft to project from said housing at one side of the axis of rotation thereof, means for reinforcing the vanes of said rotor and projecting from the opposite faces of said vanes, said housing having advertising material imposed thereon including a figure outlined at least in part by a portion projecting beyond said housing, a member representing a part of said figure pivoted to said projecting portion, a crank carried by said shaft, and means for transmitting movement of said crank to said pivoted member to actuate the same relative to said projecting portion, said vane reinforcing means serving to entrap and utilize for actuation of said rotor air currents directed at a small angle to said shaft.

3. In an animated sign, an open sided housing, a shaft journaled in said housing, a wind driven rotor mounted on said shaft to project from said housing at one side of the axis of rotation thereof, said housing having advertising material imposed thereon including a figure outlined at least in part by a portion projecting beyond said housing, a member representing a part of said figure pivoted to said projecting portion, and means actuable by rotation of said shaft for pivoting said member.

4. In an animated sign, an open sided housing, a shaft journaled in said housing, a wind driven rotor mounted on said shaft to project from said housing at one side of the axis of rotation thereof, said housing having advertising material imposed thereon including a figure outlined at least in part by a portion projecting beyond said housing, a member representing a part of said figure shiftably connected with said projecting portion, and means actuable by rotation of said shaft for shifting said member.

5. In an animated sign, an open sided housing, a shaft journaled in said housing, a wind driven rotor mounted on said shaft and projecting from said housing at one side of the axis of rotation thereof, said housing having advertising matter imposed thereon including a figure, a member representing a part of said figure shiftably connected to said housing for visual association with said figure, and means actuable by rotation of said shaft for actuating said member.

6. In an animated sign, an open sided housing, a wind driven rotor journaled in said housing to project therefrom at one side of its axis of rotation, said housing having advertising matter imposed thereon including a figure, a member representing a part of said figure shiftably connected with said housing for visual association with said figure, and means actuated by rotation of said rotor for actuating said member relative to said housing and figure.

7. In an animated sign, an open sided housing, a wind driven rotor journaled in said housing to project therefrom at one side of its axis of rotation, said housing having advertising matter imposed thereon including a figure, a member representing a part of said figure shiftably connected with said housing for visual association with said figure, and means actuated by rotation of said rotor for actuating said member relative to said housing and figure including a speed reduction device.

8. A wind actuated drive member comprising a stationary open sided housing, a shaft journaled in said housing in spaced relation to the open side thereof, and a rotor including a plurality of vanes fixedly carried by said shaft to project therefrom in equi-angular relation, whereby a portion of at least one of said vanes projects from said housing at all times to be acted upon by air currents, said housing shielding the major portion of said rotor from air currents, and transmission means associated with said shaft.

9. In an animated sign, a stationary open sided housing, a shaft journaled in said housing in spaced relation to the open side thereof, and a rotor including a plurality of vanes fixedly carried by said shaft to project therefrom in equi-angular relation, whereby a portion of at least one of said vanes projects from said housing at all times to be acted upon by air currents, advertising matter imposed on said housing including a figure, a member representing a part of said figure shiftably connected to said housing for visual association with said figure, and transmission means associated with said shaft and said member.

10. A wind actuated drive member comprising a stationary open sided housing, a shaft journaled in said housing, a rotor including a plurality of vanes fixedly carried by said shaft to project therefrom in equiangular relation, a reinforcing member projecting from the opposite faces of each vane, a portion of at least one of said vanes projecting from said housing at all times to be acted upon by air currents, said reinforcing member providing a corner against which air currents directed at an angle to the face of a vane may act to actuate said rotor, said housing shielding the major portion of the rotor from the air currents, and transmission means associated with said shaft.

GUSTAVE A. KULL.